Feb. 16, 1937. W. C. WYLAND 2,070,980
EGG CANDLING AND SIZING MACHINE
Filed Oct. 14, 1933 4 Sheets-Sheet 3
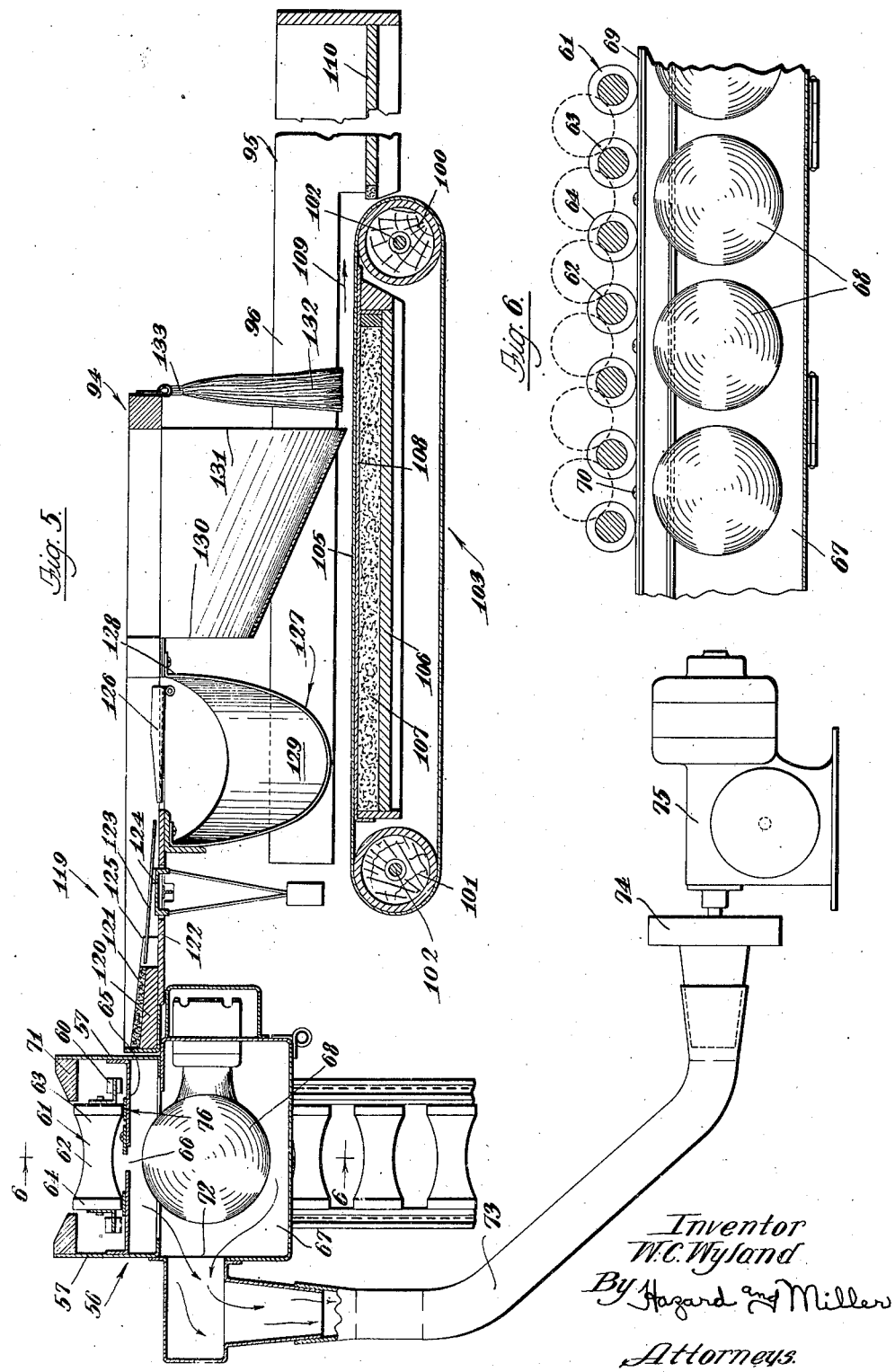
Inventor
W.C. Wyland
By Hazard and Miller
Attorneys.

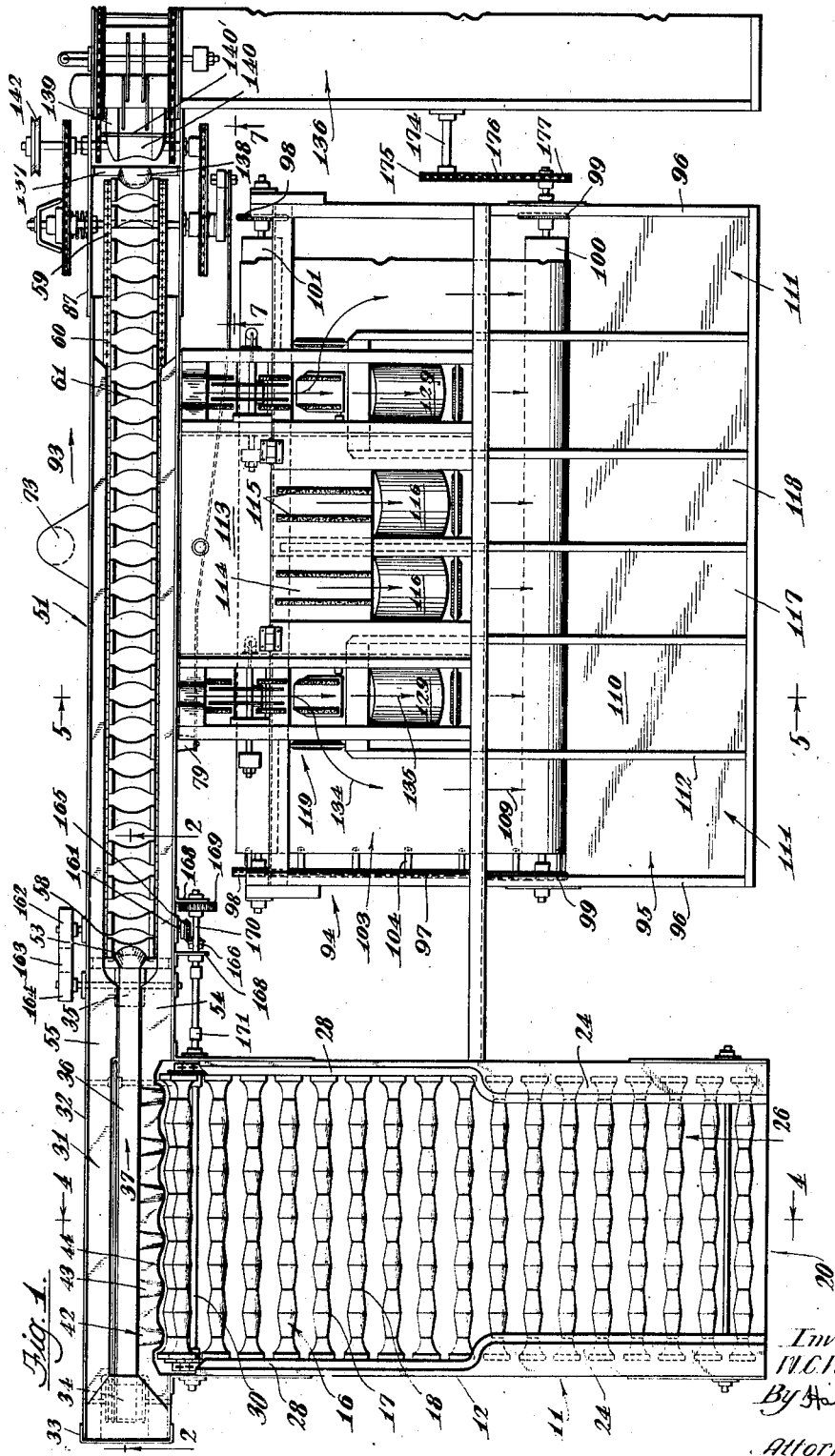

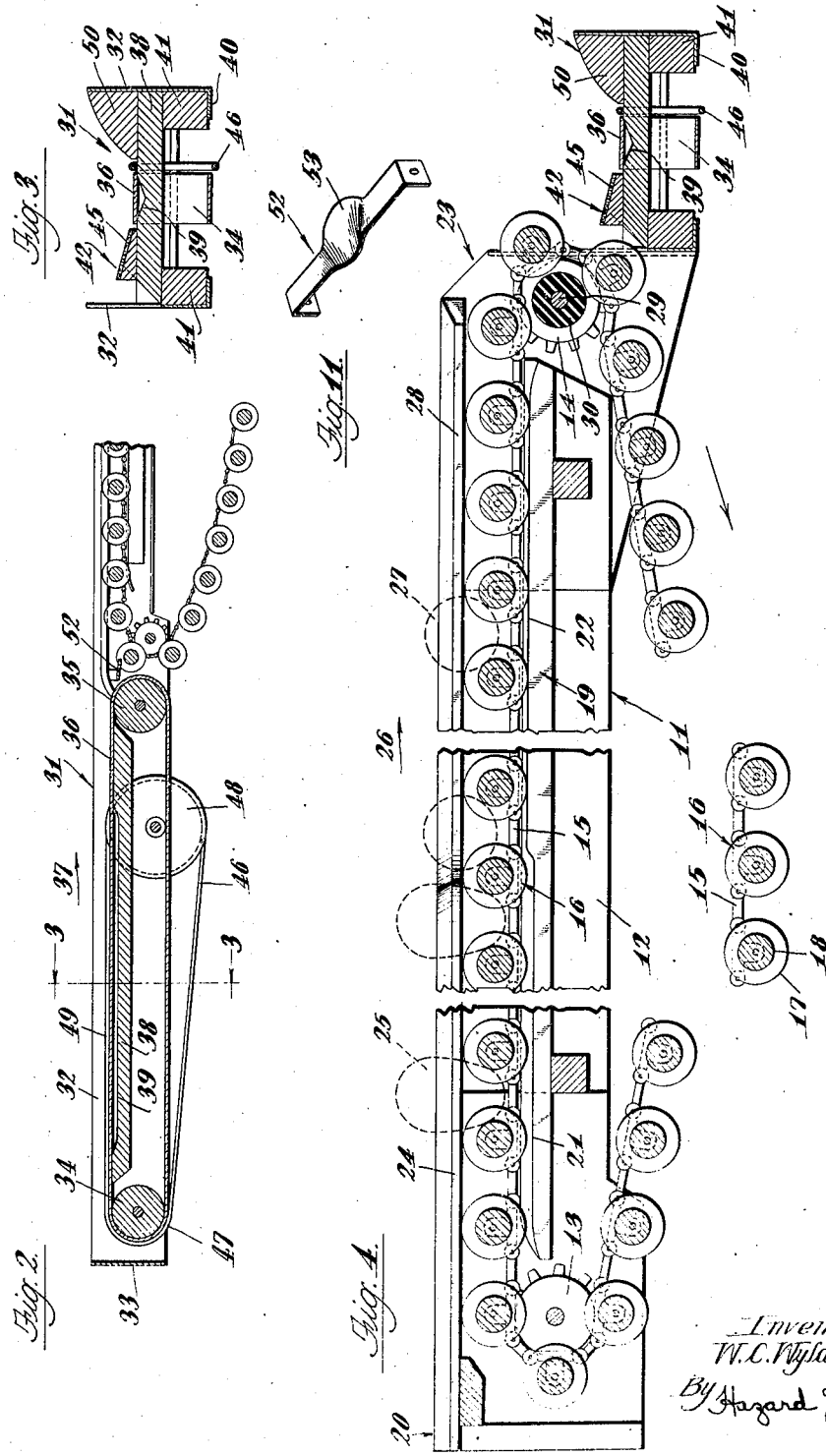

Feb. 16, 1937. W. C. WYLAND 2,070,980
EGG CANDLING AND SIZING MACHINE
Filed Oct. 14, 1933 4 Sheets-Sheet 4
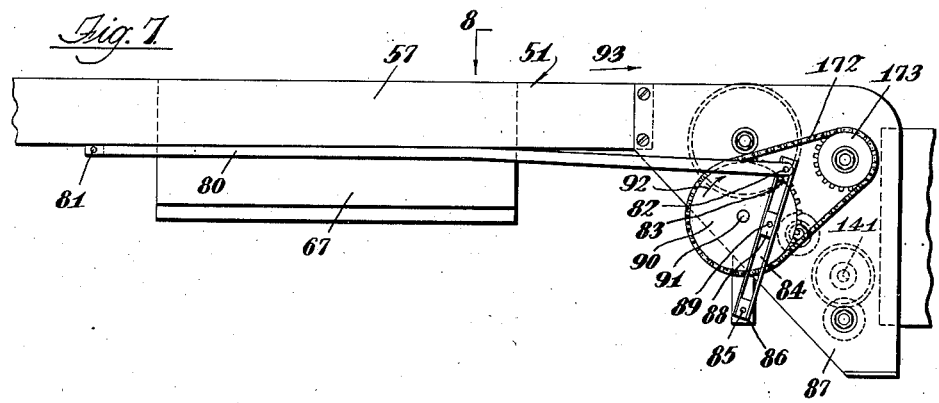
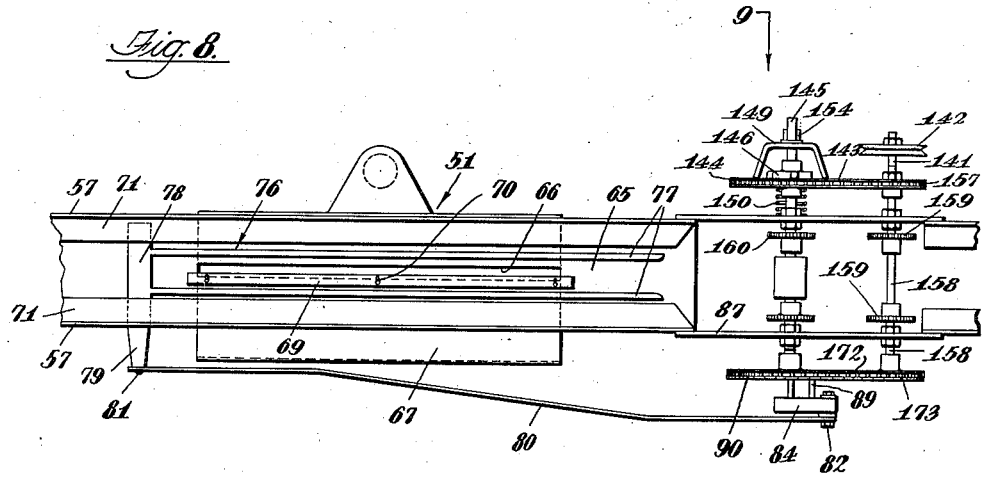
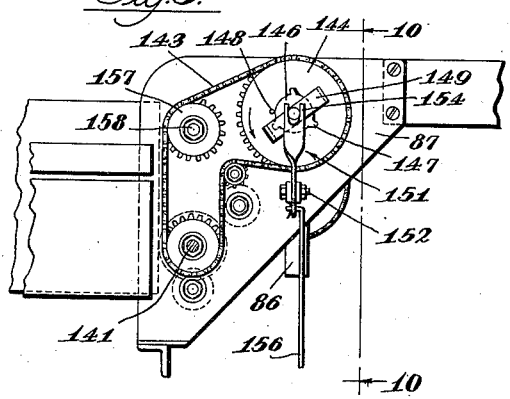
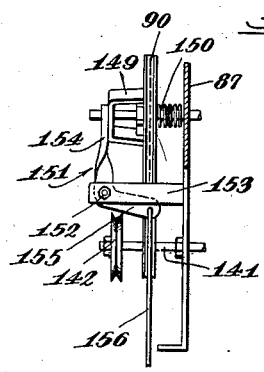
Inventor
W. C. Wyland
By Hazard and Miller
Attorneys.

Patented Feb. 16, 1937

2,070,980

UNITED STATES PATENT OFFICE 2,070,980

EGG CANDLING AND SIZING MACHINE

William C. Wyland, San Gabriel, Calif., assignor to J. W. Wyland & Sons, a corporation of California Application October 14, 1933, Serial No. 693,608

15 Claims. (Cl. 88—14.8)

My invention relates to a combination egg candling and sizing machine in which I employ a multiple row feeder on which the eggs are deposited a considerable number at a time. This feeds the eggs to a single row feeding machine, which latter feeds the eggs to a candling apparatus. In connection with the candling apparatus I provide an auxiliary grading machine by weight for separating a number of grades of inferior eggs and finally the better class eggs are delivered from the candling machine to a main egg sizing machine by weight in which the eggs are graded in accordance with their weight into different standard grades.

An object, therefore, of my invention is so assembling the multiple row feeder, the single row feeder, the candling machine, the auxiliary and main sorting machines that these operate as a complete egg handling plant.

A further object and feature of my invention relates to certain of the various units of the egg handling plant, for instance, in connection with the multiple row feeder an object and feature of my invention is the employment of a roller type of feeder in which at one end eggs may be placed on the rollers while the rollers in their forward movement have no rotation and, moreover, the rollers which are provided with a number of places reduced in diameter to accommodate the shape of the eggs have confining side walls by which eggs may be placed on the multiple row feeder in standard units from a filler of an egg case. The dimensions are preferably made so that six rows of six eggs each may be deposited on the conveyor at one time, this being thirty-six eggs. These eggs are usually packed in the fillers with the small end downwardly and the air cell upwardly.

A further feature of my invention in connection with the multiple row feeder is in the further movement of the feeder rotating the rows to shift the eggs with their longitudinal axes transverse of the feeder, that is, it tilts the eggs from having the long axes of the eggs vertical to having the long axes of the eggs horizontal. Such eggs are thus brought in rows of six to a single row feeding belt which operates across the end of the multiple row feeder. In connection with the transfer of eggs from rollers of the multiple row feeder to the single line belt feeder I employ an egg supporting roll on a sprocket wheel shaft. This prevents the eggs dropping to too great an extent between the feed rollers and forces the discharge of the eggs without breakage.

An object and feature in the single row feeding belt is the construction of the belt conveyor by which during the first portion of the movement the eggs are prevented from turning on the belt, that is, they move on the belt with their long axes longitudinally of the belt. They are prevented from turning on a vertical axis by means of an auxiliary moving circular or rope belt which runs parallel to the supporting belt. Also, the supporting belt operates over a table having a longitudinal groove in which the eggs may depress the belt.

Another feature in connection with the combined construction and operation of the candling machine which has rollers mounted on an endless chain is in providing a bridging plate at the end of the belt conveyor which, in cooperation with the rollers, rotates the eggs on a vertical axis to present the long axes of the eggs transversely to the rollers of the candling machine.

One of the objects and features of my invention in connection with the egg candling machine which employs a single line of egg supporting rollers mounted on endless chains is a continuous and mechanical operating means for spinning eggs. This may be considered a further development over my United States Patent No. 1,864,034, dated June 21, 1932, for Egg candling machine. In my present egg candling machine I employ parallel tracks on which the rollers operate when above the source of illumination and this track has a mechanical reciprocation so that when the track is moving in the direction of movement of the rollers it moves at substantially the same speed as the rollers so that the eggs do not have any spin but the reverse movement is given at a relatively high velocity, giving the eggs a quick rotation due to rotation of the rollers or spools. This spins the liquid portion of the egg in reference to the shell and allows quicker observation of the condition of the egg.

Another feature of my invention in connection with the egg candling machine is using a regulating strip for varying the width of the slot through which the light is projected upwardly from the lamp source.

A cooperative feature of my invention is the employment with the egg candler of the grading machine for grading the inferior eggs. In this I employ a wide, endless belt which operates transversely to the candling machine at one side so that the egg candler can stand on one side of the candling machine and deposit the defective eggs on the opposite side. In connection with the grader for inferior eggs I have an improvement in the grading of eggs by weight by which the eggs from one scale may be discharged laterally on to the continuously moving belt and thus two grades of eggs may be moved by the same belt into parallel receiving pockets or bins.

Another feature of my invention in connection with the depositing of the eggs on the transverse belt is the use of a hammock type of chute, this being formed of canvas supported on opposite sides and on a slope so that this hammock structure may swing due to the weight of the egg and the egg rolls down the slope of the hammock and at the discharge lower end of the hammock passes through the retarding screen formed of a curtain made of a large number of depending strings or cords.

A further feature of my invention relates to the various rates of feeding of the endless belt, single row and conveyor which has a surface speed higher than that of the candling machine spools in order to quickly remove the eggs delivered in a row by the multiple row feeder, also to crowd the eggs onto the candling machine and to rotate the eggs on a vertical axis.

My invention is illustrated in the accompanying drawings, in which:

Fig. 1 is a plan of the plant for handling eggs.

Fig. 2 is a longitudinal section on the line 2—2 of Fig. 1 in the direction of the arrows showing the transfer belt between the multiple row feeding machine and the single row candling machine.

Fig. 3 is a vertical transverse section on the line 3—3 of Fig. 2 in the direction of the arrows.

Fig. 4 is a vertical longitudinal section on the line 4—4 of Fig. 1 in the direction of the arrows through the multiple row feeding machine.

Fig. 5 is a vertical transfer section on the line 5—5 of Fig. 1 in the direction of the arrows through the candling machine and part of the grading machine by weight for inferior eggs.

Fig. 6 is a detailed longitudinal section on the line 6—6 of Fig. 5 in the direction of the arrows through part of the single row candling machine.

Fig. 7 is a side elevation taken in the direction of the arrow 7 of Fig. 1 of the candling machine showing the reciprocating link for the egg spinning tracks.

Fig. 8 is a plan of the structure of Fig. 7 taken in the direction of the arrow 8 showing the egg spinning tracks and the drive mechanism, the endless spool feeder being omitted.

Fig. 9 is a side elevation taken in the direction of the arrow 9 of Fig. 8 showing the clutch and drive connection for the roller feed chains of the candling machine and the drive for the egg spinning tracks.

Fig. 10 is a vertical transverse section on the line 10—10 of Fig. 9 in the direction of the arrows, illustrating the clutch operating mechanism.

Fig. 11 is a perspective view of a transfer or bridging plate between the endless belt feeder and the endless roller chain conveyor and candling machine.

The multiple row endless roller chain feeding machine is constructed as follows, having reference particularly to Figs. 1 and 4. This machine employs a suitably supported frame structure 11 which has side rails 12 in which there are journalled two sets of sprocket wheels 13 and 14 and over these sprocket wheels operate two endless chains 15, there being one chain adjacent each side rail. Each of these chains is provided with suitable links so that egg supporting rollers 16 are journalled on the chains. These rollers have sections of relatively large diameter 17 and other sections of relatively smaller diameter 18 forming a series of spools. The construction shown has six spools in each row. The eggs are accommodated between the contracted or spool sections of the rollers.

Secured to each side rail there is a track 19. A portion of the track adjacent the feeding end 20 has the upper surface 21 of the track cut away or depressed. The upper surface 22 of the track adjacent the discharge end 23 of the endless chain roller conveyor is at a higher level so that the rollers will roll on the surface 22 and thus rotate as the endless chains are driven and the rollers pass over this section 22 of the track.

Cover strips 24 are located on each side of the frame above the upper run of the endless roll conveyor adjacent the feeding end 20 and cover a portion of the ends of the rolls so that the space between the strips 24 is sufficient to accommodate a filler of an egg case having six rows of eggs each way, in other words, thirty-six eggs in the filler. As these fillers are placed over the moving endless roller conveyor the eggs have their long axes upwardly as indicated at 25. The eggs are usually placed in the filler with the small end downwardly and the air cell end upwardly. The depressed surface 21 of the track 19 is immediately below the place where the fillers are intended to be placed on the endless conveyor, that is, between the cover strips 24, so that the rollers in this section do not rotate although they have a forward feed motion in the direction of the arrow 26.

When the rollers contact with the surface 22 of the tracks 19 these rollers rotate and turn the eggs so that their long axes are horizontal, as illustrated by the eggs at 27. The eggs when in this position thus ride with one egg at each spool section of the rollers. This accommodates six eggs in a row between the wide side portions 28 of the frame or side walls of the multiple row feeder.

A shaft 29 connects the sprocket wheels 14 and on this shaft there is a transfer padded or resilient roller 30, this preferably being formed of rubber, and is designed to prevent the eggs slipping between two adjacent feed rollers mounted on the endless chain when these feed rollers reverse their direction of movement from the upper to the lower run of the endless chains adjacent the discharge end 23 of the endless multiple row feeder. In placing eggs on this multiple row feeder the operator handling the fillers from the egg cases stands at the infeeding end 20.

The eggs from the multiple row feeder are deposited on the single row endless belt conveyor illustrated particularly in Figs. 1, 2, 3 and 4. This endless belt conveyor has a suitable frame structure 31 which has side rails 32 and an end plate 33 connecting the two side plates. There are two rollers 34 and 35 journalled in the side rails 32 and over these rollers operates an endless belt 36, the upper run of this belt traveling in the direction of the arrow 37. The belt passes over a feed board 38 which has a V-shaped longitudinal groove 39 extending partly lengthwise of the feed board and across the full length of the board which is opposite the discharge end of the multiple row endless roller feeder.

In the construction of the frame for the endless belt feeder the side rails 32 are illustrated as having inturned flanges 40 which support strips 41, these strips giving a bridging support for the feed board 38. Adjacent the discharge end of the multiple row feeder there is a transfer apron 42 which is formed of a board with sloping grooved surfaces 43. This board has its marginal edge 44 shaped to conform to the spool contour of the rollers of the multiple row feeder, and these grooved surfaces are provided with a felt covering 45 so that the eggs in dropping from the upper elevation of the multiple row feeder are gently deposited on the upper run of the belt 36 and roll onto this belt with the long axes of the eggs positioned longitudinally of the endless belt 36.

As it is desirable to convey the eggs on the endless belt for a portion of their distance of travel with their long axes longitudinally of the belt, I employ an additional endless rope or cord 46. This operates over a pulley 47 secured to the roller 34 or the shaft carrying this roller and over a second pulley 48 adjacent the end of the position in which it is desired to have the eggs travel with their longitudinal axes lengthwise.

The upper run 49 of the rope or cord belt is slightly above the upper surface of the upper run of the endless belt 36 so that the eggs will contact with this rope or cord instead of engaging the filler strip 50 mounted on the outside of the feed board 38 adjacent the outer rail 32 of the endless belt conveyor.

The eggs are transferred from the endless single belt conveyor to the candling machine designated generally by the assembly numeral 51, which machine is illustrated particularly in Figs. 1, 5, 6, 7, and 8. At the transfer end of the endless belt conveyor it is desirable to have the eggs rotate on the endless belt so that their long axes are transverse to the belt. This is done by discontinuing the elevated guide rope 46 and using a transfer plate or apron 52 (note Figs. 2 and 11), which plate has a curved groove 53 shaped to accommodate the eggs at their sections of small circumference. The eggs crowd against this transfer apron and also the rolls of the candling machine hereinunder described in detail, and also contact with the discharge end portion 54 of the apron 42 as well as contact with the discharge end portion 55 of the filler strip 50. This causes the eggs to rotate on vertical axes, shifting the eggs from a position of their long axes extending longitudinally of the endless belt to a position with their axes transverse to such belt.

The detail mechanism of the egg candling machine so far as the conveyor is concerned employs a suitable frame or supporting structure 56 which has suitable side rails 57 upon which are journalled sprocket wheels 58 and 59. Over these sprocket wheels operate chains 60 and between the lengths of the chains there are feed spools or rollers 61. These rollers have their center section 62 of smaller diameter than their outer section 63; in order that the eggs between the two adjacent rollers will have their longitudinal axes transverse to the roller feed chain of the egg candler each of the rolls of the candling machine is provided with a cylindrical rolling surface 64.

The candling machine is provided with a floor plate 65 extending between the side rails, which plate has a slot 66 positioned above the lamp box 67, which box has a series of illuminating lamps 68 therein. An adjustable edge strip 69 is mounted on one side of the floor 65 adjacent the slot 66 and by means of the screws and groove fitting 70 this strip 69 may be adjusted across the slot 66 in order to control the effective width of the band of light from the lamp 68. In order to confine the light from these lamps cover strips 71 are secured to the upper edge of the side rails 57 adjacent the ends of the spools so that when eggs are carried by the spools the light from the lamps must pass through the eggs.

In order to provide ventilation for the lamps and to maintain the egg candling machine in cool condition, I provide an air vent opening 72 in the lamp box at one side thereof and an exhaust duct 73 leading to an exhaust fan 74 driven by, preferably, an electric motor 75. The air may enter the lamp box at opposite ends and also pass around the eggs and enter through the slot 66. By this means there is a downward flow of air at the upper run of the spools and the egg candler is not bothered by an up draft of hot air.

The mechanism for spinning the eggs to facilitate observation of the condition of the liquid in the eggs in comparison with the shell is by means of a slidable track designated by the assembly number 76 (note Fig. 8). This track has a pair of rails 77 which slide on the floor 65 of the egg candler on opposite sides of the slot 66 and such rails are positioned to engage the cylindrical section 64 at each end of each spool. The two rails 77 are connected to a reciprocating crosshead 78, which crosshead has an extension arm 79 extending through a slot in one of the side rails 57 of the egg candling frame. A link or pitman 80 is pivoted to the extension 79 of the crosshead as indicated at 81 and has its other end pivoted at 82 to a block 83, which block is secured in a channel shaped rock arm 84. This arm has its lower end 85 pivoted to a bracket 86, which bracket is illustrated as secured to a gusset plate 87 adjacent the discharge end of the egg candling machine. The rock arm 84 is provided with a sliding block 88 which engages a crank pin 89 on the driven sprocket wheel 90, this being mounted on a transverse shaft 91 journalled in the gusset plates 87. This sprocket wheel is rotated in the direction of the arrow 92. Therefore, when the block 88 is in a low position in the rock arm 84 this rock arm has a quick movement to the left, referring to Figs. 7 and 8. Hence, the track 76 is given a rapid movement in a direction opposite to the direction of the feed 93 of the upper run of spools of the candling machine. However, when the block 84 is in an upper position relative to the shaft 91 the pitman, and, hence, the spinning track 76, is being moved in the direction of the arrow 93 at approximately the same rate of speed as the feeding spools. Therefore, these feeding spools do not rotate or rotate but slowly while the track 76 is moving in the direction of the feed of the eggs, but the track is given quick movement when going in the opposite direction, hence spinning the spools and the eggs carried thereby. This gives a swirl or rotating movement to the fluid of the egg and allows the egg candler to better observe the condition of the egg while the track 76 is moving in the same direction as the feed of the eggs, as indicated by the arrow 93.

The relative rate of speed of the multiple row feeder and the single row candling rollers and of the endless belt conveyor is such that the eggs are fed from the multiple row feeder six at a time to the endless belt and from the endless belt one at a time to the spools of the candling machine. Thus, the six eggs deposited at one time on the endless belt are moved clear of the discharge end of the multiple row feeder before a second row is deposited on this belt.

An important feature of my invention as relates to the complete egg handling plant is a sizing and grading machine for defective eggs, this being designated by the assembly numeral 94 and illustrated more particularly in Figs. 1 and 5. In this machine I employ a suitable lower frame structure 95 which has side rails 96 and is supported by legs or the like extending upwardly from the floor. Sprocket chains 97 operate over sprocket wheels 98 and 99 journaled in the side rails or the equivalent construction of the frame 95. Belt supporting rollers 100 and 101 are loosely mounted on the shafts 102 connecting the sprocket wheels 98 and 99 on the opposite sides of the frame and over these rollers operates a feed belt 103. The belt is connected at its marginal edges by clips 104 to the endless chains 97. Thus the chains drive the belt and the belt rotates the rollers 100 and 101. The upper run 105 of the wide endless belt 103 operates over a table 106, which table has a felted or equivalent thick pad 107 and a cover strip 108 of canvas or the like. The eggs are fed in the direction of the arrow 109 and deposited on the floor 110 of bins 111, these being separated one from another by partitions 112.

Adjacent the center of the candling machine I provide a hinged cover 113 opposite the side of the machine having the discharge air duct 73. The egg candler stands on the side of the machine having this air duct and he may reach across the hinge plate 113 and deposit defective eggs on the tracks 114, which tracks are formed with felt rails 115, and these rails lead to discharge chutes 116. For instance, the eggs may be deposited from two center chutes 116 into a bin 117 which may be for defective eggs having broken or checked shells and into another bin 118 which may be for eggs which are designated as rotten or having blood spots.

A feature of my invention as regards the sizing of eggs by weight and used in connection with the sizer for defective eggs is a construction for discharging some of the eggs laterally onto the upper run 105 of the wide endless belt 103. This is illustrated in connection with the egg sizer by weight designated by the assembly numeral 119. (Note particularly Figs. 1 and 5.) In this construction a wood apron piece 120 is located at the side and extending longitudinally of the egg candling machine. This is, preferably, covered with felt and has a pair of sloping rails 121, which rails are also, preferably, covered on their upper edge with felt. These rails are positioned above a floor plate 122. The rails 121 slope downwardly toward the moving rails 123 on a weighing platform 124. The lower end 125 of the rails 121 is positioned quite close to the top of the rails 123 to lessen the drop of the eggs on the weighing scale.

The sizing appliance by weight may be made in accordance with the U. S. Patent to J. W. Wyland, No. 1,728,463, patented September 17, 1929, for an Egg sizing machine by weight, in which the weighing scales and dumping platforms are electrically interconnected, or it may be in accordance with the patent application filed in the name of J. W. Wyland, Serial No. 429,724, filed February 19, 1930, for an Egg sizing machine by weight, in which the scales and the dumping platforms are mechanically interconnected. In the construction illustrated in Fig. 5, if an egg is of sufficient weight to depress the scale it actuates the dumping panel 126. This drops the egg into a hammock 127. The hammocks are all similar and are formed of canvas attached to the upper part of the frame of the weighing machine at the sides 128. This makes a sloping canvas hammock, the lower portion 129 having a downward slope; this is due to the upper end 130 being shorter than the lower end 131. The eggs are discharged from the hammock against a fringed curtain 132 which is formed of strings or cords suspended from the upper end 133 of the frame of the egg weighing machine.

It will be noted, referring to Fig. 1, that the eggs which actuate the weighing scales are discharged laterally in the direction of the arrow 134 onto the endless moving conveyor 103 whereas the eggs which are too light to operate the weighing scale are discharged in the direction of the arrow 135 in the direction of movement of the upper run of the conveyor belt 103. By this construction I may have a plurality of grade bins with discharge chutes for eggs which are not to be graded by weight, and then on the extreme ends of this row I may have grading machines by weight discharging in opposite directions on the endless belt or apron, as indicated in Fig. 1. This construction, as shown in Fig. 1, grades the imperfect eggs in six grades.

The eggs which pass the egg candling machine, that is, those which are of sufficiently high grade in quality, are carried to a sizing and grading machine by weight indicated by the assembly number 136 (note Fig. 1). This may be constructed in the general manner of either of the above mentioned machines for egg sizing by weight except that it is not necessary to have an endless belt conveyor for forcing the eggs. However, it is not necessary to have an endless belt feeding conveyor as set forth in Patent No. 1,728,- 463 as the egg candling machine forms a positive egg feed. However, in the present assembly I use a bridging strip 137 which is provided with a curved groove 138 to accommodate the eggs being carried with their long axes transverse, and the eggs roll from the bridging strip 137 to a second bridging throat 139 which has a grooved surface 140 to accommodate the rolling eggs. The eggs are then engaged by the conveyor slats 140' of the egg sizing machine.

The drive connection for the various feeding machines and the candling machine is through a main drive shaft 141 (note Figs. 1, 7 to 10). This main drive shaft has a pulley 142 which is, preferably, actuated by a belt drive from an electric motor or the like. This shaft 141, which is indicated as journalled in the gusset plates 87, operates by a sprocket chain 143 and the driven sprocket 144 which is slidably mounted on the clutch shaft 145. The clutch comprises a toothed wheel 146 having teeth 147 which engage a pin 148 on the sprocket wheel 144. This sprocket wheel may be shifted by the sliding yoke 149 which slides on the shaft 145 in order to move the sprocket wheel 144 against the compression spring 150 and shift the pin 148 out of engagement with the teeth 147.

The manner of actuating the clutch yoke is through the medium of a bell crank 151. This bell crank is pivoted at 152 on a bracket 153 extending laterally from the frame of the machine. The upper end 154 engages the yoke 149 and the lower end 155 of the bell crank is connected by a link 156 to a foot pedal or the like, not illustrated. This foot pedal or other control for the link 156 is located at a convenient position for operation by the egg candling operator.

The chain 143 driven by the shaft 141 operates over a sprocket gear 157. This sprocket gear is mounted on a shaft 158 which has sprocket wheels 159 driving the feed slats of the egg sizing machine 136 so that this machine is constantly driven whereas the egg feeding machines and the egg candler may be intermittently driven on account of the clutch shaft 145 having sprockets 160 thereon which drive the endless chains of the egg candling machine.

At the opposite end of the egg candling machine the shaft 161, which carries the sprockets driven by the chain of the egg candler, actuates a pulley 162 which, by means of a belt 163, actuates a pulley 164 driving the roller 35 for the endless belt conveyor. In addition, the shaft 161 has a beveled gear 165 thereon which actuates a complementary beveled gear 166 on a shaft which is mounted in brackets 168 on the side frame of the egg candling machine. This actuates a reduction gear train 169 and from this gear train a driven shaft 170 having a pair of universal joints 171 actuates the shaft 29 of the multiple row egg feeder. Through this connection, when the clutch is opened the multiple row egg feeder, the single row belt feeder, and the roller conveyor of the egg candling machine come to rest. When the clutch is closed these mechanisms operate.

However, I have a continuous drive for the reciprocating track of the egg candler which is through the medium of the sprocket wheel 90, driven by a sprocket chain 172 (note Figs. 7 and 8), the chain 79 being driven by a sprocket 173 on the continuously driven shaft 141. Therefore, presuming the egg candler wishes to spin the eggs without longitudinal movement of the eggs, the feeding of the eggs may be stopped but the reciprocation of the track is continued through the continuous rotation of the sprocket wheel 90. The eggs are thus spun in opposite directions in accordance with the direction of the reciprocation of the track 76.

In order to give a continuous drive to the egg sizing machine 94 for defective eggs I utilize a drive shaft 174 (note Fig. 1) which leads from the apron of the egg sizing machine 136. Through the medium of a sprocket gear 175 and a sprocket chain 176 a driven sprocket 177 on shaft 102 of the endless belt apron is actuated. Thus the egg candling operator, even if he has stopped the egg feeding and the egg candling machine, may remove defective eggs from the egg candling feeding rollers and have these graded by the grading machine 94.

An important feature of my invention has to do with the speed of the related drives of the multiple row egg feeder, the endless belt single row feeder and the single row candling machine feeding spools. As above mentioned the eggs from the multiple row feeder are fed onto the single row belt conveyor in a multiple unit, these are put in the machine illustrated six at a time. During the first portion of the transit of the eggs on the endless belt conveyor the longitudinal axes of the eggs is longitudinal of the conveyor. This endless belt is operated at a higher surface speed than the spool conveyor of the candling machine so that it crowds the eggs onto the candling machine and exerts a pressure whereby the eggs are rotated on a vertical axis so that at the outfeeding end of the endless belt the eggs have their long axes transverse to the belt.

Moreover, the belt must operate at such a speed in reference to the multiple row egg feeder that the complete unit of six eggs is removed sideways from the end of the multiple row feeder before another unit of six eggs is deposited on this endless belt.

Another important feature having to do with the grading of the eggs is maintaining a constant motion for the endless aprons of the grading machines 136 and 94 even when the feeding on the egg candler is stopped and on the egg candler, the multiple row and single belt feeder is stopped, as this allows the operator, while the feed of eggs is stopped, to grade those found defective.

It is desirable after the plant starts in operation that every space between adjacent spools on the egg candling machine is filled with an egg. This is accomplished by the endless transfer belt 36 which, as above mentioned, runs at a higher surface speed than the spools of the candling machine and also at a sufficiently high speed to clear the eggs deposited on the endless belt from the discharge end of the multiple row feeder before another row is presented for discharge from such feeder. The multiple row feeder and the single row candling spools operate in such timed relation that six eggs are carried away by the candling conveyor as often as six eggs are discharged from the multiple row feeder. The endless belt 36 on account of its higher surface speed has a crowding action forcing the eggs on the spools of the candling machine so that when these begin operating and six eggs have been fed onto the candling machine that after this there will be no vacant spaces between the spools of the candling machine.

In transferring the eggs onto the weighing platform 124 the weight of the egg is transferred gradually onto the tracks 123 which are resilient being preferably made of wire. The upper end of these rails 123 is overlapped longitudinally by the fixed rails 121 and also these rails 121 are on the outside. As the eggs roll down the rails 121 the portion of the egg on the small circumference engages the rails of the track 123 and this gradually takes the whole weight of the egg without any shock of the egg dropping onto rails 123 because on account of the delicate adjustment as to weight any dropping shock would tend to disturb the accurate weighing of the eggs.

Various changes may be made in the details of construction without departing from the spirit or scope of the invention as defined by the appended claims.

I claim:

1. In a multiple row egg feeding machine, parallel endless chains having a plurality of rollers journalled therein, means to move the upper run of the rollers in the direction of feed, means to support the rollers by the chain for non-rotation at the place of depositing the eggs downward thereon, and tracks to engage the rollers to rotate the same to rotate the eggs with their long axes parallel to the rollers, cover strips over portions of the rollers adjacent the place of depositing the eggs, said rollers having spool sections, the cover strips terminating at substantially the tracks where the rollers are rotated, said cover strips limiting the exposed spool section and thereby requiring a complete transverse row of eggs to be deposited with their long axes vertical.

2. In a single belt egg feeding machine, a flat endless belt, means to move the upper run of the belt in the direction of feeding the eggs, means to feed a row of eggs at one time onto said belt, and a secondary belt having its upper run positioned on one side of the flat belt and slightly above said belt, said secondary belt having its upper run moving in the same direction as the upper run of the flat belt.

3. In an egg handling machine, a multiple row egg feeding machine having parallel endless chains with rotatable rollers mounted therebetween for transporting rows of eggs, a single flat endless belt having its upper run operating transversely to the direction of feed of the rollers, a secondary belt positioned on one side of the flat belt remote from the rollers, the upper run of the secondary belt moving in the same direction and slightly above the flat belt.

4. In an egg handling machine, an endless flat belt conveyor having its upper run operating in the direction of the feed of the eggs, means to deposit eggs on the belt with their long axes in the direction of movement of said belt, a secondary belt positioned at one side of the flat belt and having its upper run moving in the same direction and slightly above said flat belt, an egg candling machine having an endless chain of roller spools, the upper run of the spools moving in the same direction as the flat belt, a transfer apron, and a retarding structure adjacent the flat belt for turning the eggs with their long axes transverse to the direction of feed of the candling spools.

5. In an egg handling machine, an endless flat belt conveyor having its upper run operating in the direction of feed of the eggs, a secondary belt positioned at one side of the flat belt and having its upper run moving in the same direction and slightly above said flat belt to engage one side of eggs carried by the conveyor belt, and means to deposit eggs on the flat belt from the side remote from the secondary belt.

6. In an egg handling machine, an endless flat belt conveyor having its upper run operating in the direction of feed of the eggs, means to deposit eggs on the belt with their long axes in the direction of movement of the belt, a secondary belt positioned at one side of the flat belt and having its upper run moving in the same direction and slightly above said flat belt, to engage eggs when deposited on the flat belt and retain the eggs with their long axes parallel to the belts, an egg retarding structure adjacent the discharge end of the flat belt, the termination of the upper run of the second belt being spaced from the discharge end of the flat belt, whereby the pressure of eggs on the retarding structure turns eggs in said space on the flat belt with their long axes transverse to the flat belt.

7. In a multiple row egg feeding machine, parallel chains having a plurality of rollers journalled therein, the rollers having spool sections in longitudinal alignment, means to move the upper run of the rollers in the direction of feed, cover strips over the spool portion of certain of the rollers and forming a restriction for depositing eggs thereon requiring the eggs to be deposited with their long axes vertical, means to support the rollers by the chains for non-rotation, substantially underneath the cover strips at the place of depositing the eggs to prevent rotation of the eggs during deposit, and tracks to engage the rollers towards their discharge end to thereby rotate the eggs and bring their long axes parallel to the rollers.

8. An egg handling machine, comprising in combination a first endless chain multiple row spool type of conveyor, having means to support and discharge eggs, a plurality at a time with their long axes transverse to the conveyor, a second single row endless belt conveyor positioned at the discharge end of the first conveyor to receive the eggs and convey the eggs in the direction of their long axes, a third single row endless spool type of conveyor in alignment with the belt conveyor, means to operate the belt conveyor at a higher surface speed than the third conveyor to crowd eggs at their point of transfer from the second to the third conveyor and turn the eggs with their long axes transverse to the third conveyor.

9. In a multiple row egg feeding machine, a pair of side rails each with a first guide surface, a pair of parallel endless chains, means to move the upper run of chains in the direction of feed with the chains sliding on said surface, a plurality of rollers journalled between the chains each having a series of enlarged and reduced sections forming annular grooves, the enlarged and reduced sections of the successive rollers in the upper run being in alignment, a pair of tracks each having a second guide surface to engage the rollers and rotate same during part of their travel, the rollers adjacent the place of depositing eggs being clear of the guide surface and non-rotating, whereby eggs may be deposited downwardly on the non-rotating rollers with their long axes substantially vertical and when the rollers rotate such eggs are turned with their long axes transverse.

10. In a multiple row egg feeding machine, a pair of parallel endless chains having rotating rollers therebetween for supporting eggs on their upper run, a resilient transfer roller located at the position of reverse bend of the endless chains at the discharge end to limit the distance of dropping of the eggs between adjacent rollers to discharge substantially all of the eggs between a pair of rollers simultaneously, the transfer and egg supporting rollers being connected to turn at the same angular velocity in the same direction.

11. In an egg candling machine, endless chains having a roller spool conveyor, means to move the upper run of the conveyor in the direction of feed of the eggs, a track to engage the spools and to rotate same, means interconnecting the spool feed means with the track to reciprocate said track whereby on the movement of the track in the direction of the feed of the eggs the track moves at substantially the same speed as the forward movement of the spools whereby the spools have but little or no rotational movement.

12. In an egg candling machine having an endless chain with roller spools mounted thereon, a feeding means to move the upper run of the spools in the direction of feed of the eggs, a reciprocating track positioned to engage the spools and to retard or prevent the rotation of the spools when the track moves in the direction of feed of the eggs but to rotate the spools rapidly when the track moves counter to the direction of feed of the eggs, an operative means having a drive connection to the means for moving the upper run of the spools to continuously reciprocate the track, means to at will stop and start the feeding movement of the roller spools while maintaining a continuous reciprocation of the track.

13. In an egg candling machine as claimed in claim 12, the endless chain with roller spools providing a first conveyor, a runway for eggs at the discharge end of the upper run of such first conveyor, a second conveyor having slats to engage the eggs and move the eggs along the runway, the means to stop and start the feeding movement of the first conveyor having a clutch, an interconnected drive through the clutch to the second conveyor having the slats, the clutch having means to synchronize the movement of the first conveyor having the roller spools and the second conveyor having the slats so that when the clutch is in a driving relation, the two conveyors operate in synchronism, the second conveyor having a driving means to maintain the slats in operation while the first conveyor having the roller spools is stationary.

14. In an egg candling machine having an endless chain with rotatable spools thereon for supporting eggs, a track positioned to engage the spools, a driving means to move the upper run of the spools in the direction of feed of the eggs, a reciprocating means interconnecting said track with the spool drive operative when the track moves in the direction of the feed of the eggs to move the track at substantially the same rate as the spools whereby the spools have a motion of translation without a motion of rotation and whereby when the track moves in the opposite direction the spools have a motion of translation and a motion of rotation.

15. In an egg candling machine as claimed in claim 14, the endless chain with rotatable spools comprising a first conveyor, a second conveyor including a runway located at the discharge end of the first conveyor, the second conveyor having slats to engage eggs and move the eggs over the runway, means to give a continuous drive to the second conveyor, the reciprocating means for the track being operatively connected with the second conveyor to have a continuous reciprocating motion, a clutch interconnecting the drive for the first conveyor with the drive for the second conveyor having means whereby when the clutch is in driving relation, the first and second conveyors are synchronized so that eggs discharged by the first spool conveyor are in a position to be engaged by the slats of the second conveyor.

WILLIAM C. WYLAND.